(12) United States Patent
Simone et al.

(10) Patent No.: US 11,924,207 B2
(45) Date of Patent: Mar. 5, 2024

(54) INTER-APPLICATION MANAGEMENT OF USER CREDENTIAL DATA

(71) Applicant: Salesforce.com, Inc., San Francisco, CA (US)

(72) Inventors: John Simone, San Francisco, CA (US); Fiaz Hossain, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 16/588,466

(22) Filed: Sep. 30, 2019

(65) Prior Publication Data

US 2020/0204552 A1 Jun. 25, 2020

Related U.S. Application Data

(63) Continuation of application No. 16/042,983, filed on Jul. 23, 2018, now Pat. No. 10,432,635, which is a continuation of application No. 15/197,728, filed on Jun. 29, 2016, now Pat. No. 10,033,740, which is a continuation of application No. 13/178,511, filed on Jul. 8, 2011, now Pat. No. 9,405,896.

(60) Provisional application No. 61/474,538, filed on Apr. 12, 2011.

(51) Int. Cl.
| | | |
|---|---|---|
| *H04L 9/40* | (2022.01) | |
| *G06F 8/20* | (2018.01) | |
| *G06F 16/951* | (2019.01) | |
| *G06F 21/41* | (2013.01) | |
| *H04L 67/01* | (2022.01) | |

(52) U.S. Cl.
CPC .............. *H04L 63/10* (2013.01); *G06F 8/20* (2013.01); *G06F 16/951* (2019.01); *G06F 21/41* (2013.01); *H04L 63/08* (2013.01); *H04L 67/01* (2022.05); *H04L 63/105* (2013.01)

(58) Field of Classification Search
CPC ......... H04L 63/10; H04L 63/08; H04L 67/42; H04L 63/105; G06F 16/951; G06F 8/20; G06F 21/41
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |

(Continued)

FOREIGN PATENT DOCUMENTS

CN 112988171 A * 6/2021 ............ G06F 8/61

OTHER PUBLICATIONS

Final Office Action for U.S. Appl. No. 16/391,084 dated Apr. 21, 2021, 7 pages.

(Continued)

*Primary Examiner* — Michael R Vaughan
(74) *Attorney, Agent, or Firm* — Kwan & Olynick LLP

(57) ABSTRACT

A system and apparatus for enhancing the functionality and utility of an authentication process for web applications is disclosed.

9 Claims, 4 Drawing Sheets

(56) References Cited

U.S. PATENT DOCUMENTS

| | | |
|---|---|---|
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,546 B1 * | 6/2005 | Haswell .............. G06F 11/3684 714/38.11 |
| 7,289,976 B2 | 10/2007 | Kihneman et al. |
| 7,340,411 B2 | 3/2008 | Cook |
| 7,620,655 B2 | 11/2009 | Larsson et al. |
| 7,761,885 B2 * | 7/2010 | Labrou ................ G06F 9/465 715/700 |
| 8,365,150 B2 * | 1/2013 | Wong ................... G06Q 30/02 717/126 |
| 8,479,144 B2 * | 7/2013 | Nakatani .............. G06F 21/10 717/100 |
| 8,640,202 B2 * | 1/2014 | Roy .................... G06F 21/335 726/2 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0177113 A1 * | 9/2004 | Nguyen .................. H04L 67/36 709/203 |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0020679 A1 * | 1/2006 | Hinton .................... G06F 21/41 709/217 |
| 2006/0168054 A1 * | 7/2006 | Burkhart ................ H04L 51/04 709/206 |
| 2009/0177744 A1 | 7/2009 | Marlow et al. |
| 2009/0328174 A1 * | 12/2009 | Cen ....................... H04L 63/205 714/48 |
| 2010/0083359 A1 * | 4/2010 | Readshaw ............... H04L 9/321 726/7 |
| 2010/0131530 A1 * | 5/2010 | Gibson ............... G06F 16/9038 707/758 |
| 2010/0198730 A1 * | 8/2010 | Ahmed ................ G06F 21/6209 705/50 |
| 2010/0293094 A1 * | 11/2010 | Kolkowitz ............. G06Q 20/40 705/44 |
| 2010/0306547 A1 * | 12/2010 | Fallows .................. G06F 21/31 713/178 |
| 2011/0035417 A1 * | 2/2011 | Cohen .................... G06F 16/213 707/803 |
| 2011/0093813 A1 * | 4/2011 | Watanabe ................ G06F 8/61 715/810 |
| 2012/0102455 A1 * | 4/2012 | Ambat ................ G06F 9/45558 717/115 |
| 2012/0173490 A1 * | 7/2012 | Gould ................ G06F 11/1474 707/648 |
| 2012/0185930 A1 | 7/2012 | Desai et al. |
| 2012/0197957 A1 * | 8/2012 | De Voogd ........... G06F 16/9577 709/201 |

(56) References Cited

U.S. PATENT DOCUMENTS

2012/0239578 A1* 9/2012 Kang .................. G06Q 20/322
 705/71
2012/0266229 A1* 10/2012 Simone .................. H04L 63/08
 726/9
2016/0344719 A1* 11/2016 Simone .................. H04L 67/01

OTHER PUBLICATIONS

Corrected Notice of Allowance for U.S. Appl. No. 15/197,728 dated Apr. 25; 2018, 5 pages.
Final Office Action for U.S. Appl. No. 13/178,511 dated Apr. 30, 2015, 13 pages.
Final Office Action for U.S. Appl. No. 13/178,511 dated May 21, 2014, 10 pages.
Final Office Action for U.S. Appl. No. 15/197,728 dated Jul. 13, 2017, 12 pages.
Final Office Action for U.S. Appl. No. 15/225,751 dated Jul. 14, 2017, 9 pages.
Hardt, D., Ed. "The OAuth 2.0 Authorization Framework" Standards Track, Oct. 2012, 77 pages.
Non-Final Office Action for U.S. Appl. No. 13/178,511 dated Aug. 13, 2015, 11 pages.
Non-Final Office Action for U.S. Appl. No. 13/178,511 dated Oct. 10, 2014, 10 pages.
Non-Final Office Action for U.S. Appl. No. 13/178,511 dated Oct. 24, 2013, 13 pages.
Non-Final Office Action for U.S. Appl. No. 15/197,728 dated Dec. 29, 2016, 13 pages.
Non-Final Office Action for U.S. Appl. No. 15/197,728 dated Nov. 15, 2017, 8 pages.
Non-Final Office Action for U.S. Appl. No. 15/225,751 dated Dec. 29, 2016, 14 pages.
Non-Final Office Action for U.S. Appl. No. 16/042,983 dated Feb. 7, 2019, 7 pages.
Notice of Allowance for U.S. Appl. No. 13/178,511 dated Mar. 25, 2016, 13 pages.
Notice of Allowance for U.S. Appl. No. 15/197,728 dated Mar. 28, 2018, 8 pages.
Notice of Allowance for U.S. Appl. No. 15/225,751 dated Nov. 22, 2017, 9 pages.
Notice of Allowance for U.S. Appl. No. 16/042,983 dated Jun. 5, 2019, 8 pages.
Winterfeldt, David. Simple Spring Security Webapp. 2008. Spring by Example Part IV. Web. Oct. 17, 2013.

* cited by examiner

INTER-APPLICATION MANAGEMENT OF USER CREDENTIAL DATA

PRIORITY CLAIM

This continuation application claims the benefit of U.S. patent application Ser. No. 16/042,983, entitled "INTER-APPLICATION MANAGEMENT OF USER CREDENTIAL DATA", filed Jul. 23, 2018, now U.S. Pat. No. 10,432,635, with an issue date of Oct. 1, 2019, which is a continuation of U.S. patent application Ser. No. 15/197,728, entitled "INTER-APPLICATION MANAGEMENT OF USER CREDENTIAL DATA", filed Jun. 29, 2016, now U.S. Pat. No. 10,033,740, issued Jul. 24, 2018, which is a continuation of U.S. patent application Ser. No. 13/178,511, entitled "INTER-APPLICATION MANAGEMENT OF USER CREDENTIAL DATA", filed Jul. 8, 2011, now U.S. Pat. No. 9,405,896, issued Aug. 2, 2016, which further claims the benefit of U.S. Provisional Application No. 61/474,538 entitled "Security Framework for a Multi-Tenant Database System", filed Apr. 12, 2011, the entire contents of which are incorporated herein by reference.

FIELD OF THE INVENTION

The embodiments discussed herein relate to a system and apparatus for enhancing the functionality and utility of an authentication process for web applications.

BACKGROUND

Many software development kits (SDKs) for web applications require some type of authentication mechanism. One potential authentication mechanism is known as OAuth (open authentication). However, OAuth has limited functionality, so that it could be beneficial to provide enhancements to OAuth.

Meanwhile, developers of Database.com Java SDK (JSDK) client applications want an easy way to authenticate their existing users into their applications. It is desired this development be kept simple, with as much complexity as possible hidden away.

Another problem exists. In the past, for a user switching between multiple web applications, there was a lack of persistence. That user would at times have to log out and re-log in to each web application, or set up a database to manage the user data for the separate web applications. A developer must be concerned about multiple instances of an application, and replicating authentication across all of those instances.

Consequently, a mechanism for resolving these issues is desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF PREFERRED EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figure 1:
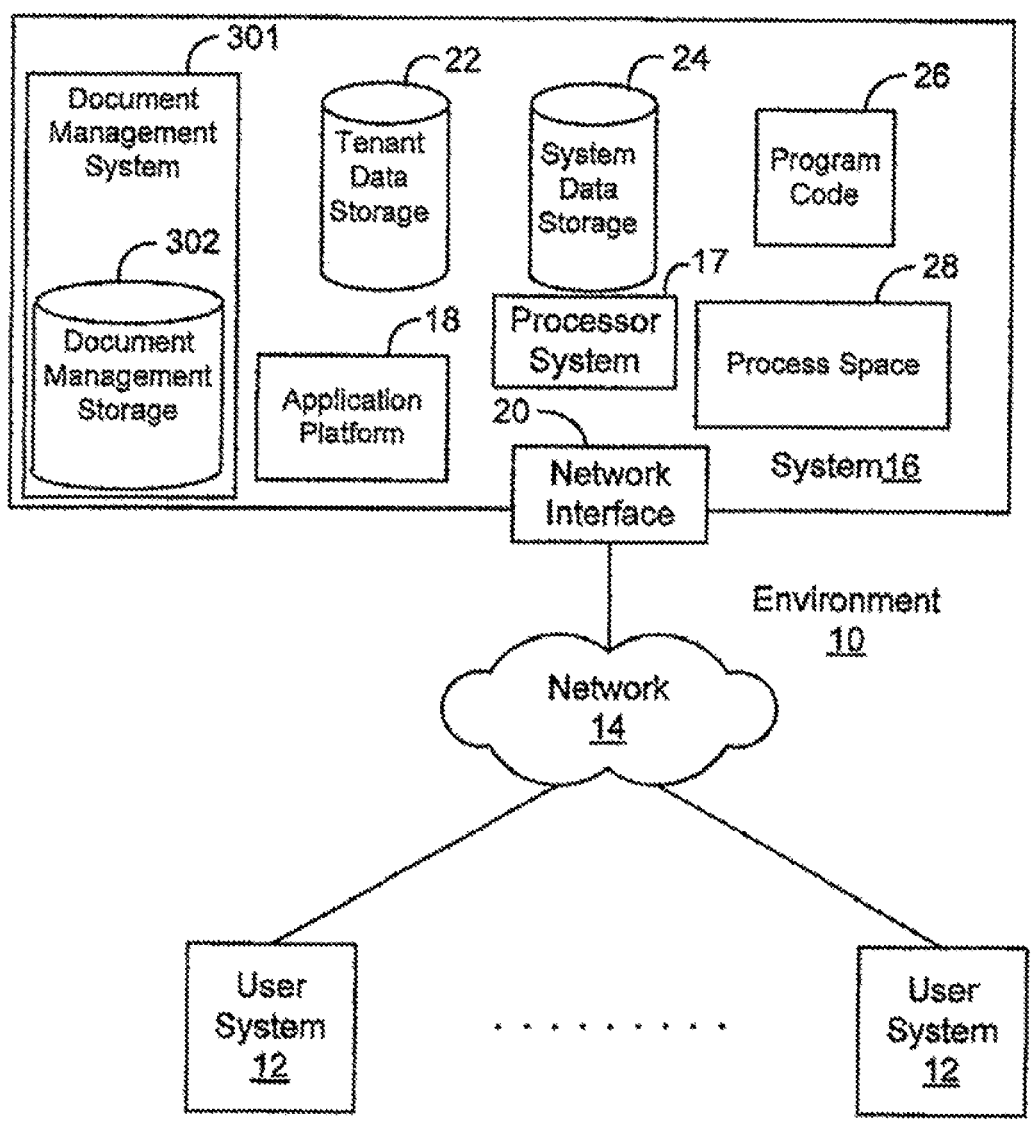
FIG. 1 depicts an example of a cloud platform.

FIG. 1 illustrates a block diagram of an environment 10 wherein an on-demand document management system and database service might be used. Environment 10 may include user systems 12, network 14, system 16, processor system 17, application platform 18, network interface 20, tenant data storage 22, system data storage 24, program code 26, process space 28, document management system 301, and document management storage 302. In other embodiments, environment 10 may not have all of the components listed and/or may have other elements instead of, or in addition to, those listed above.

Environment 10 is an environment in which an on-demand database service coupled with a document management system exists. User system 12 may be any machine or system that is used by a user to access a database user system. For example, any of user systems 12 can be a handheld computing device, a mobile phone, a laptop computer, a workstation, and/or a network of computing devices. As illustrated in FIG. 1 (and in more detail in FIG. 2) user systems 12 might interact via a network 14 with an on-demand database service, such as system 16, coupled with a document management system 301 and document management storage 302.

An on-demand database service, such as system 16, is a pre-established database system that is made available to outside users that do not need to necessarily be concerned with building and/or maintaining the database system, but instead may be available for their use when the users need the database system (e.g., on the demand of the users). Some on-demand database services may store information from one or more tenants into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In an embodiment, a hierarchical role based model is not used. However, in systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In an embodiment, system 16, shown in FIG. 1, implements a web-based customer relationship management (CRM) system. For example, in one embodiment, system 16 includes application servers configured to implement and execute CRM software applications as well as provide related data, code, forms, webpages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 2:
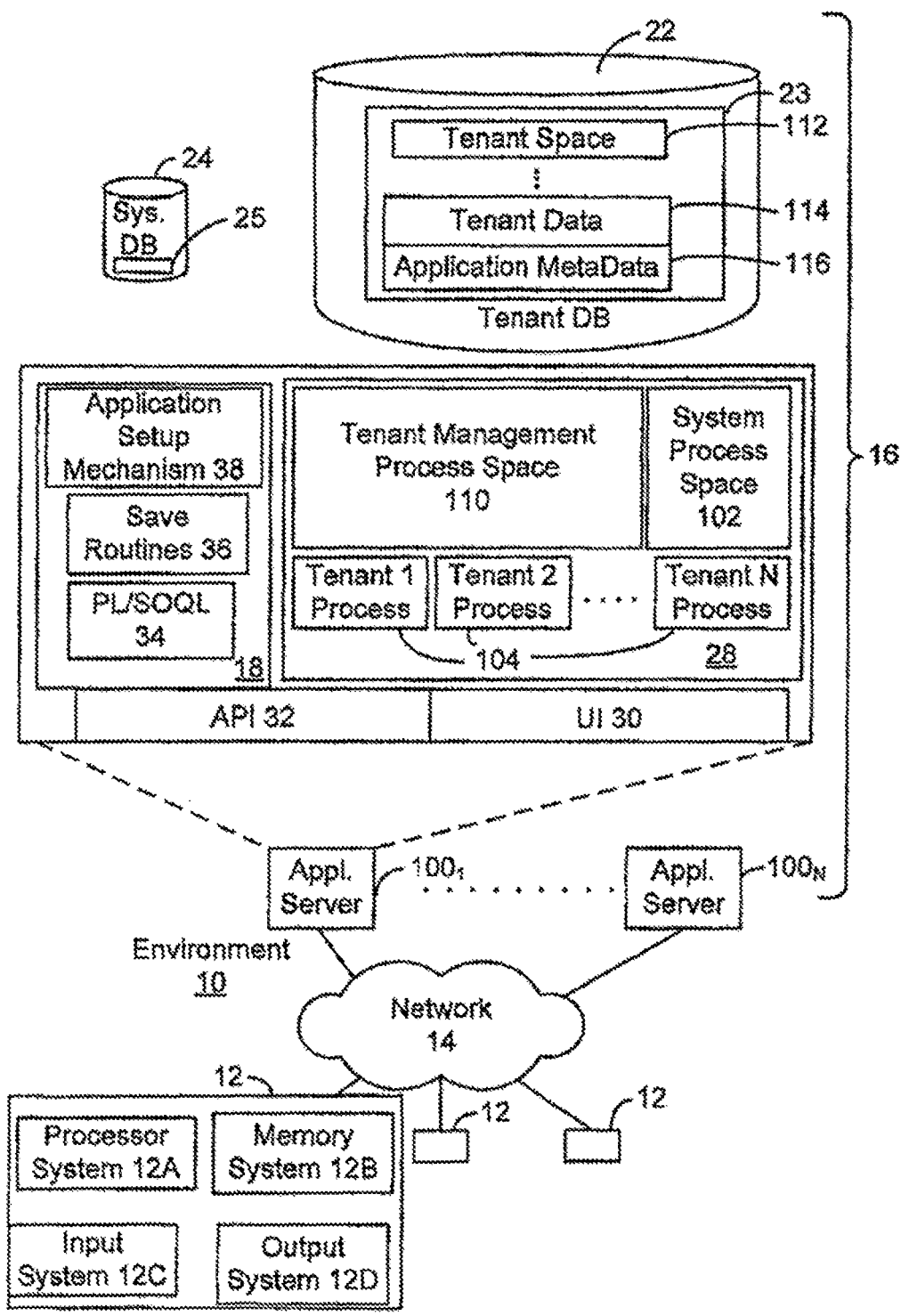
FIG. 2 further depicts an example of the cloud platform of FIG. 1.

One arrangement for elements of system 16 is shown in FIGS. 1 and 2, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes. System 16 may include document management system 301, which may include document management storage 302 supporting storage and retrieval of documents on behalf of tenants whose data is managed and housed by system 16.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Mozilla's Firefox, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to an embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide webpages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 2 also illustrates portions of environment 10, as well as elements of system 16 and various interconnections in an embodiment. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers 100₁-100ₙ, system process space 102, tenant process spaces 104, tenant management process space 110, tenant storage area 112 (which may also be referred to as "tenant storage space"), user storage 114 (which may also be referred to as "user data"), and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers of one or more tenant process spaces 104 managed by tenant management process 110 for example. Invocations to such applications may be coded using PL/SOQL 34 that provides a programming language style interface extension to API 32. Invocations to applications may be detected by one or more system processes, which manage retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server 100₁ might be coupled via the network 14 (e.g., the Internet), another application server 100ₙ₋₁ might be coupled via a direct network link, and another application server 100ₙ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

CONTEXT OF EMBODIMENTS

Developers of on-demand database services want an easy way to authenticate users into applications connecting to their services. For example, developers of Database.com Java SDK (JSDK) applications want an easy way to authenticate their existing users into their applications. Java SDK applications use Salesforce.com user accounts for authentication and identity management of users. As such, each user of Salesforce.com can be a potential user of a JSDK application. Database.com is designed for use by developers, along with Force.com. Both are platforms that support custom development based on the Salesforce.com platform. As stated, it is desired this development be kept simple, with as much complexity as possible hidden away from that developer. Accordingly, the embodiments disclosed herein provide a pre-built framework that implements an improved authorization flow. Within this framework, a developer does not have to write any specific code to make the authorization flow work.

Figure 3:
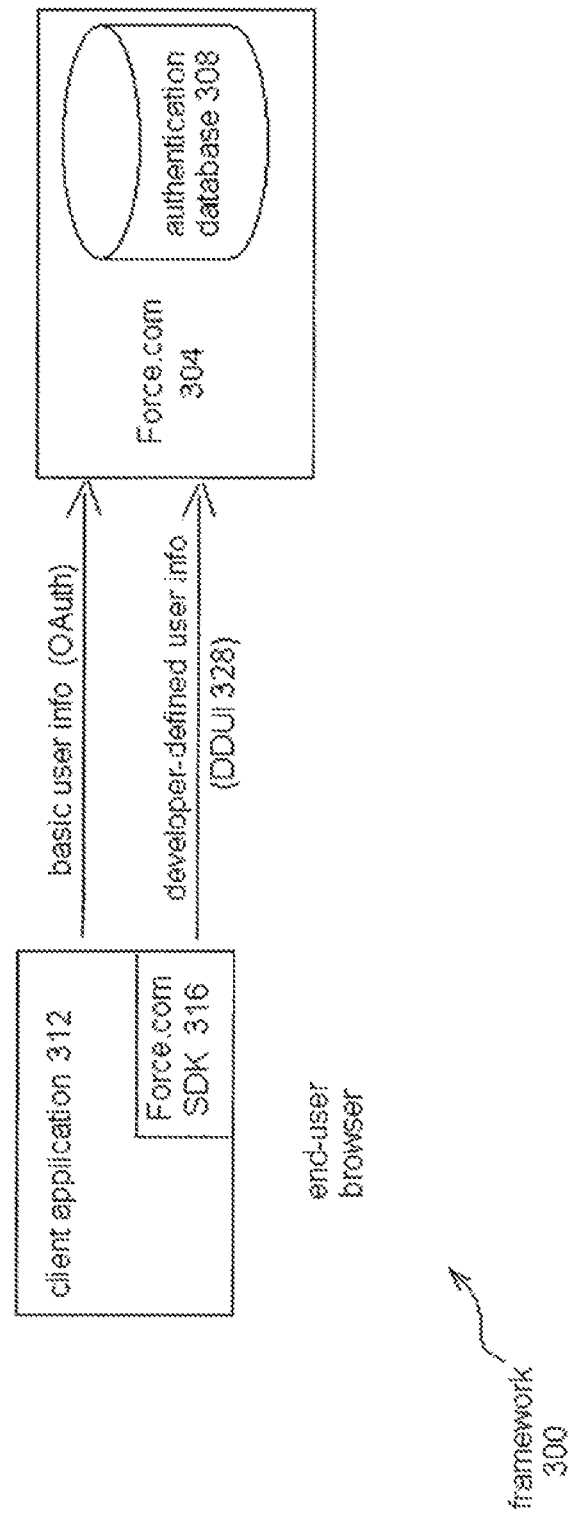
FIG. 3 depicts additional details of application relationships.

As shown in FIG. 3, a framework 300 an online database platform 304 which is a service that is authorizing an authentication database 308. Using a client application 312 built with the Force.com SDK 316 having the features discussed herein, that user could authenticate solely into Salesforce.com, and then get into other web applications, but in doing so remain stateless. The various hooks/APIs discussed herein are for client applications 312 that can be built on top of the base Force.com SDK 316.

Using these APIs, a client application 312 could obtain user information or OAuth credentials from other non-Force applications, such as but not limited to Twitter or Facebook. That developer can use Force.com 304 as a "source of truth" about one or more users.

Thus, the embodiments discussed herein have facets of a "single sign-on" arrangement, but are not completely in a single sign-on mode. Once a user is authenticated, Force.com 304 maintains a session for that user. Whatever data objects that user stores as part of that session, the embodiments discussed herein extend those data objects.

NON-LIMITING LIST OF FEATURES

The embodiments described herein comprise at least the following advantages.

Allow existing Salesforce.com users to authenticate into an application through a simple framework integration;

Provide a means for the developer to find out if there is currently an authenticated user and find basic information about that user;

Provide the ability to remember a user in a session-like manner, while still minding the concerns of a highly scalable application;

Provide the ability for a developer to pull additional information about a user and make that user information available alongside standard basic user information;

Allow the user to log out of a web application and optionally also log them out of Salesforce.com at the same time;

Provide extensible user data and the necessary API hooks thereto; and

Provide developers a choice of server side v. encrypted cookie as a means of storing user data.

OAuth Background

OAuth (Open Authentication) is an open standard for authentication. OAuth allows users to share their private resources (e.g. photos, videos, contact lists) stored within one web application with another web application without having to hand out their credentials, typically UserID and password. OAuth allows users to hand out authentication tokens instead of credentials to their data hosted by a given service provider. Each authentication token grants access to a specific web application for specific resources and for a defined duration. This allows a user to grant a third party web application access to their information stored with another service provider, without sharing their access permissions or the full extent of their data. OAuth is a specific protocol that is widely used in SDKs of various web applications. However, OAuth has various limitations which are addressed by the embodiments disclosed herein.

Example of OAuth

OAuth can be explained using an example. Suppose that web application X wants to obtain data about user U from web application Y.

Now suppose that the user U doesn't like the web application X having access to his data. The user U could change his password for web application Y. However, that user U cannot revoke password access to just a single web application Y which would block future access-attempts by that web application X. Instead, it would be necessary for that user to separately change passwords in all his different web applications.

Figure 4:
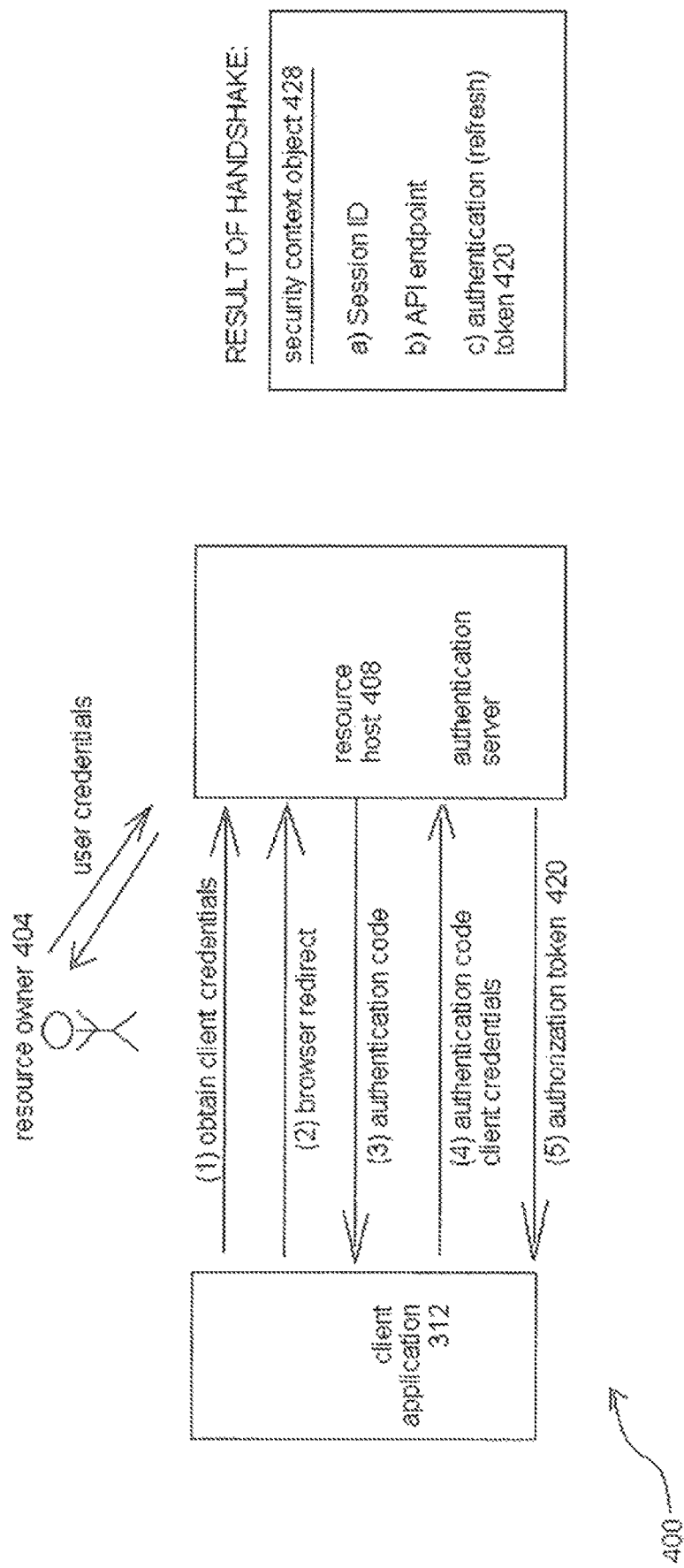
FIG. 4 depicts an authentication process.

As shown in FIG. 4, OAuth provides a structure 400 for such inter-application authentication, using a 5-step handshake process. Referring to FIG. 4, the resource owner 404 is a person, where the resource itself is data associated with a web application. Further, an example resource host 408 could be a web application.

Also as shown in FIG. 4, the resource owner 404 must provide some type of user credentials to the resource host 408. Username/password (UserID/password) is by far the most common credential example. However, the credential could also be a secure token or some other means of authentication. One such example might be IP range restrictions, where the IP address of the resource owner must be within a certain specified range. This could be an example of a third authentication credential.

Within the following explanation, an example of a resource host 408 will be Twitter, and an example of a resource owner will be a person named Bill.

As shown in FIG. 4, at step (1) it is necessary to register the client application 312 with the resource host 408. One example of this might be for the client application 312 to request to Twitter that "I want my application to be able to access you via OAuth". The resource host 408 verifies the requester, first by authenticating using the requester's UserID and password. This step is usually done from within an Internet browser, using a "browser redirect", as shown in step (2). The resource host 408 then says to Resource Owner "this application wants to access your data, so give us your UserID and password". The resource host 308 then asks the resource owner "is it OK to access your data?" It's not necessary to furnish the userID and password twice, as the Resource Host retains this information.

Once the resource owner 404 is happy, the resource owner 404 sends back an authentication code, which says "you redirected user Bill to me, and Bill passed the authentication process, so here's an authentication code for Bill". Then, ultimately, the client application will send another request back to resource host 408 asking for an authentication token for the user Bill. It will do so by including its client credentials and its authentication code, as shown in step (4). After the authentication token 420 is received back and stored, anytime the client application wishes to access resources from the resource host 408, the client application only needs to give the authentication token 420. As such, the client application 312 can now perform such accesses repeatedly.

Extending Beyond OAuth

As shown in FIG. 4, one possible outcome of a successful OAuth handshake is a Salesforce.com Session ID, an API endpoint, and a refresh token. These are all stored in a SecurityContext object 428.

At this point, the client application still may not know much about the user Bill, other than that he is who he says he is, and is a Salesforce.com user in some context. That's why, after all the handshaking of FIG. 4 is complete, the embodiments discussed herein request basic user info, but can also request customized or developer-defined user information (DDUI), which will be discussed in more detail elsewhere. The data objects returned from such a request are combined into the security context 428 (sometimes referred to as a "user information object"), and then, depending on user's configuration, are stored either in a browser cookie on the user (client) side, or in a server side session. Assuming the cookie (client) side embodiment, every time that a user makes a request, the browser cookie gets sent back up. Thus, a form of continual re-authentication occurs.

Thus, the embodiments disclosed herein are not limited only to generic access of a user's data as with OAuth, but instead can provide various types of customized access to that user data, after authentication. One example of this could be an authentication token to another web application such as Twitter.

Servlet Filter V. Spring Security

There are two flavors in which the Force.com OAuth Security Framework can be used. These are generic servlet filters, and Spring Security filters.

The generic filter is intended for use with servlet-based web applications that do not operate using any specific security framework, either Spring Security or other. A developer of a client application (e.g. 312) can use the API hooks build into the Force.com SDK 316 to create Servlet filter mappings that can include this generic filter for requests that need to be secured. The generic filter will perform OAuth flow and route the user to the Salesforce.com login page if necessary. Once authenticated, the user's request will be chained to downstream filters and ultimately to the requested servlet/page. The generic filter will also remember the user and update thread local connector config to be used by Force Connector.

For applications that use Spring Security, the embodiments herein provide an integration that allows easy use of Force.com as an authentication provider. Spring Security is a Java framework that provides advanced authentication, authorization and other security features for, among other things, web applications.

The embodiments discussed herein differ depending on which integration point is used, but the core components that handle the authorization handshake remain the same. The ForceOAuthConnector is the class that handles most of the heavy lifting in terms of the authorization handshake. The required consumer key and consumer secret are either passed in to the connector, or injected in by Spring Security. These values are configured through the ForceServiceConnector, which is a module that is shared across the Force.com Java SDK. Once the user is authenticated, their Session ID and API endpoint is stored in thread local variables. Any code using the shared connections can use these credentials to connect to the APIs.

As discussed earlier with respect to FIG. 4, the outcome of a successful handshake is a Salesforce.com Session ID, an API endpoint, and an authentication (refresh) token 420. These are all stored in a SecurityContext object 428.

Once the user is authenticated, the UserDataRetrievalService is invoked. This service can make a call to the partner API to retrieve basic information about the user. If the developer has implemented an extension to user data retrieval, that extension is automatically invoked. The already created SecurityContext object 428 can have the user data added to it.

Servlet Flow

There are three outcomes from a request that is sent through the servlet filter:

1) The user is recognized because a cookie or session containing their SecurityContext was found. In such a case, that user's data is set up to be available during the downstream request 2) The user is not recognized: They are sent to the authorization url to begin the OAuth handshake. There are two outcomes from this: they either need to enter credentials on the login screen or they already have a Force.com session and can be immediately directed back, often without user knowledge that the redirect even took place.

3) The token request can be sent to obtain the Session ID, API endpoint, and authentication (refresh) token 420. The user's data is then set up to be available during the downstream request.

Spring Security Flow

Spring Security follows a similar flow to the simple servlet filter, but because of the nature of the Spring Security framework, the work is distributed across a few classes. The main workers in Spring Security integration are:

Authentication Processing Filter
Authentication Provider
Remember Me Services
Authentication and Logout Success Handlers
Force Connection Storage Filter The first 4 in the above list are standard API hooks in the Spring Security flow. The last one is a customization exclusive to the Force.com SDK 316 that takes care of storing data to ForceSecurityContextHolder and ForceServiceConnector.

At a high level, flow starts at the Authentication Process Filter. This extends the Spring Abstract Authentication Processing Filter to allow for a url like '/login' that automatically directs the user into the OAuth flow and to the login page. The embodiments herein also override the attemptAuthentication method, and instead branch into the OAuth flow. This is Spring's API hook that can be called once the framework has decided that the user is attempting to access a page that requires authentication. At the end of attemptAuthentication, Spring's authentication manager is triggered which has its Authentication Provider registered. The authentication provider then pulls data out of the SecurityContext that is created by the OAuth flow and finishes populating Spring's authentication data by creating principals and setting the user's role.

The "remember me" services are called by a standard Spring Security filter, RememberMeFilter. This is used to provide remember me functionality, usually (but not always) through cookies. Assuming the use of cookies, the "remember me" services can implement the cookie logic that looks for and decrypts the SecurityContext information from a browser cookie. However, it is again noted that the embodiments discussed herein contemplate a non-cookie arrangement.

The connection storage filter is set to be called after the "remember me" filter, which is the last filter in the integration process. That is, since the connection storage filter is responsible for storing and remove the authentication data in the thread local backed holder classes, it is important that it be executed last. This ensures that whether the user is authenticated through OAuth or instead is remembered, the proper storage always happens and it is always cleaned up afterwards.

Within Spring Security, users can be defined utilizing, for example, XML files. Specifically, Spring Security allows for making a list of web applications, including what user roles have what specific access within those web applications. Thus, Spring Security can define a whole custom set of roles and assign those roles to users, using XML files. Examples of such roles can include user, administrator, manager, etc.

However, Spring Security doesn't dictate or stipulate how the users get defined. Conversely, the embodiments described herein can be used to define how the users get defined. For example, within the present embodiments, it is possible to take any piece of Force.com data, and assign that data into roles. Spring Security by itself could not achieve this, as it does not and cannot know how Force.com defines data structures. Meanwhile, as will be discussed in more detail hereinafter, the embodiments described herein allow for customizing of different types of specific user roles.

The Authentication success handler is responsible for ensuring that the proper redirect happens after the OAuth flow is finished. It also allows for a default success URL to be set. Upon logout, the Logout Success Handler clears out the cookies.

Statelessness and Scalability

Any application which wants to use the Force.com SDK requires a high degree of scalability. As stated earlier, the embodiments disclosed herein are architected in order to promote scalability.

There can be at least two types of scaling, horizontal and vertical. Horizontal scaling is much more important than vertical scaling. Within a typical server farm, vertical scaling is merely adding more resources, more CPUs, more memory to a single server. Meanwhile, an example of horizontal scaling would be adding more servers.

Horizontal scaling requires either 1) statelessness, or 2) replicating state among all horizontal servers in the server farm. Option 2) is more complex, so only option 1) will be considered herein.

Server Side V. Cookies

There are two ways of maintaining the session using the embodiments discussed herein: 1) server side sessions, and 2) browser cookies.

The embodiments discussed herein result in allowing full, almost "remember me" level of functionality. This allows keeping the application server completely stateless. Thus, the embodiments discussed herein achieve their results statelessly, which is important for scalability.

All critical information needed about a user can be located for example within an encrypted cookie, which is stored client-side and usually associated with a particular browser.

Once a user authenticates, it is beneficial to remember that user so that the authorization handshake doesn't have to be repeated for each request. At a minimum, this requires remembering the Session ID and API endpoint. However, it is desired to make a best effort to remember that user data available as well.

The default behavior is to store the data in browser cookies so that the application instance stays completely stateless. This involves storing three separate cookies: Session ID, API endpoint, and a serialized and encrypted representation of the SecurityContext object.

The other option is not use cookies, but instead use server side sessions. The session approach still uses a cookie for Session ID and API endpoint, but stores the SecurityContext object in a session.

In both approaches, the framework relies on the stored SecurityContext only as a cache. An API call can always be made to retrieve this data so no real action is taken if this data doesn't exist. Instead, the cookies containing the Session ID and API endpoint are relied upon more. It is always possible to pull the Session ID and endpoint from the cookies. If a SecurityContext that matches the values from the cookies is found it can be utilized. Otherwise, the cookie information can be used to make an API call that looks up the user data.

If a cookie is being used for storage of the SecurityContext, the object is serialized and then encrypted using AES. The AES key is unique per application and can be generated as part of the deployment process.

Session-based SecurityContext storage is available, but it is not recommended for use unless sticky sessions are available, or an application can be run with a very small number of instances. This goes somewhat against the idea of scalability. However, the viability of the session approach would increase if a shared session cache were to be built.

Once a SecurityContext is retrieved or loaded it can be stored in a thread local variable and made available via static methods on the SecurityContexHolder.

Cookies: Positives and Negatives

Cookies are good for remaining stateless, which in turn increases scalability. As stated, any application which wants to use the database.com or Force.com SDK requires a high degree of scalability.

Intelligent load balancers (ILBs) are an alternative that allows scaling when instances cannot be kept stateless. However, sticky load balancing can slow processing down a bit. When ILBs are used, it becomes possible to use server side sessions to store user data.

It is possible for a user to switch between server side sessions and cookies mid-use, but to do so, the user must close and then re-start sessions, and must also do a type of cascaded or "rolling" re-start. This is inconvenient and inefficient.

Encryption cookies: if encryption key gets compromised, the corresponding cookie data could get compromised. Also, as the cookie grows in size, it must be sent up/down each time, therefore slowing transmission.

Shared Session Cache

It is possible to eliminate cookies by doing a server side session, but not writing locally to the application memory, but instead use a shared session cache. This makes maintaining statelessness on a server much easier. Each server writes to a specific session cache. This way, it is possible to still horizontally scale the servers. A critic might say that this merely pushes the problem to scaling the cache only, rather than scaling the entire server farm. However, shared session cache mechanisms are commercially available which are adept at managing the process.

Without a shared session cache, a server farm must spend extensive processor resources and bandwidth replicating data back and forth horizontally between the various servers.

Developer-Defined User Information (DDUI)

In recognition of the difficulty in predicting what user data JSDK developers may want, the embodiments described herein provide an extension point that allows the definition of custom logic to retrieve user data in addition to the default OAuth data set. This is accomplished by providing an abstract CustomSecurityContext that developers can extend to store customized developer-defined user information/data or DDUI 328. There is an API hook in the framework discussed herein which can call a CustomUserDataRetriever. This is another abstract class that a developer can extend to implement the logic that can create, populate, and return their CustomSecurityContext object. This can be called after a successful authentication such as that shown in FIG. 4, or whenever the SecurityContext needs to be refreshed according to the session management logic.

One special-case data item that the SecurityContext can provide is a user's role. When using Spring Security, the role that is given to Spring can be whatever is set on the SecurityContext. Once set, the role can be used with Spring's default page access restriction behavior and by the Spring Security taglibs. A developer can also implement any behavior they need to for the role value as part of the user data retrieval extension mechanism. This allows flexibility in case there is a need to define roles in a custom way.

If not overridden, the default behavior is for the name of the user's profile to be their role. The embodiments herein can also expose roles that can be customized on a per-application basis and allow administrative control over how users are mapped to those roles.

However, within the embodiments discussed herein, the developer-defined user information (DDUI) 328 need not be confined only to "role" data. Instead, DDUI 328 could be "atmosphere" information, an extremely simple example being the color blue. A developer could use the Force SDK and the DDUI 328 to so that for a specific user who fits a certain profile, the backgrounds of all web applications accessible by that user would be blue. This example of blue is not necessarily the most practical or valuable use of DDUI 328, but instead is provided merely to quick and simple illustration that is easy to understand.

Moving to an example that is more realistic, a business-specific web application could for example pull a primary account that a user works on. That account data would be rendered in header of a web application. A possible guideline for the DDUI 328 could be data that is needed often, but where the client application 312 does not want to be continually querying.

Another example of DDUI is data that is contained within credentials of other systems. For example, it would be possible to create a custom Force.com object in the form of a mashup of web applications such as Force.com, Twitter, and Facebook. It would be possible to use the DDUI to store OAuth tokens from e.g. Twitter and Facebook in a custom Force.com object. In that mashup, a developer could extract select customized user data from these well known web applications, thereby providing a semi-seamless integrated experience for a user. This is because that user does not need to manually switch between the various web applications, but instead have customized data present that is available and convenient without any switching.

It is important to note that there are efficiency issues with how DDUI should be used. For example, a developer would not want include a large list of leads within DDUI, because of the potential size of that list. If the DDUI were too large, it would slow down the client application. Thus, it may be suitable to include only frequently looked-up leads with DDUI. Another example of this would be to not store an entire dictionary within DDUI, but instead store only words that are frequently looked-up.

Regarding a possible range of size of the DDUI, a particular developer's best practices would determine the most efficient use of data sizes and amounts for the DDUI. The embodiments discussed herein do not contemplate specific limits or constraints on the DDUI, preferring to instead leave that to the developer's discretion. If the size of the DDUI gets too large, there becomes too much data, and too much storage on the server, which bogs down server requests.

Assuming the cookie and non server-side embodiment, one possible example of a constraint could be a hard limit on cookie size, for example 4K. In such a case, DDUI could not exceed 4K in size.

DDUI 328 could be helpful in the hands of a creative application developer whose client application 312 sits on top of the Force.com SDK 316, such as is shown in FIG. 3. Such a developer could make their client application 312 have access to the strength and richness of the database.com or Force.com set of APIs, but could also incorporate selected user data from familiar applications such as Facebook.

The intent is to give a developer of web applications using the enhanced Force.com SDK discussed herein enough room to be creative. As such, DDUI sizes do not introduce any security issues, but instead may introduce performance issues.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A computer-implemented method for providing user authorizations utilizing a set of authorization application program interfaces (APIs), the method comprising:
   providing an SDK for a client web application which performs user authorizations for multiple resources within an on-demand services environment, wherein the SDK comprises the set of authorization APIs, and wherein the set of authorization APIs is configured to:
      utilize a server-side storage for storing developer-defined user information;
   performing user authorizations with the set of authorization APIs developed by the SDK, wherein the performing the user authorizations with the set of authorization APIs is through a client web application executed by a hardware computing device to allow access to the multiple resources within the on-demand database services environment without needing to switch between the multiple resources, by creating a custom object that utilizes the developer-defined user information and comprises a mashup of select customized user data extracted from multiple web applications; and
   providing, based on the user authorizations and with one or more computing devices, the multiple resources with access to an access token without the use of cookies through a shared session cache memory.

2. The method of claim 1, wherein the security framework comprises a plurality of generic servlet filters and spring security filters.

3. The method of claim 2, wherein the generic servlet filters perform OAuth flow and routes the user to a login page.

4. The method of claim 2, wherein the generic servlet filters are used within servlet-based web applications that operate without using any specific security framework.

5. The method of claim 2, further comprising:
   operating at least one of the generic servlet filters to:
      find a cookie or session containing the user's SecurityContext so that the user is recognized;
      not find a cookie or session containing the user's SecurityContext, and sending the user to an authorization Uniform Resource Location (URL) to begin an OAuth handshake; or
      send a token request to obtain a Session ID, API endpoint, and authentication (refresh) token.

6. The method of claim 1, further comprising:
   facilitating a choice between storing user data in browser cookies or server side sessions so that application instances are completely stateless.

7. The method of claim 1, further comprising:
   during a server side session, using a shared session cache, wherein each of a plurality of servers is configured to write to a specific session cache.

8. The method of claim 1, wherein the developer-defined user information consists of frequently looked-up data.

9. A multi-tenant database system, comprising:
   a processor; and
   memory, the memory storing instructions to cause the processor to execute a method, the method comprising:
   providing an SDK for a client web application which performs user authorizations for multiple resources within an on-demand services environment, wherein the SDK comprises the set of authorization APIs, and wherein the set of authorization APIs is configured to:
      utilize a server-side storage for storing developer-defined user information;
   performing user authorizations with the set of authorization APIs developed by the SDK, wherein the performing the user authorizations with the set of authorization APIs is through a client web application executed by a hardware computing device to allow access to the multiple resources within the on-demand database services environment without needing to switch between the multiple resources, by creating a custom object that utilizes the developer-defined user information and comprises a mashup of select customized user data extracted from multiple web applications; and
   providing, based on the user authorizations and with one or more computing devices, the multiple resources with access to an access token without the use of cookies through a shared session cache memory.

* * * * *